Patented Oct. 12, 1926.

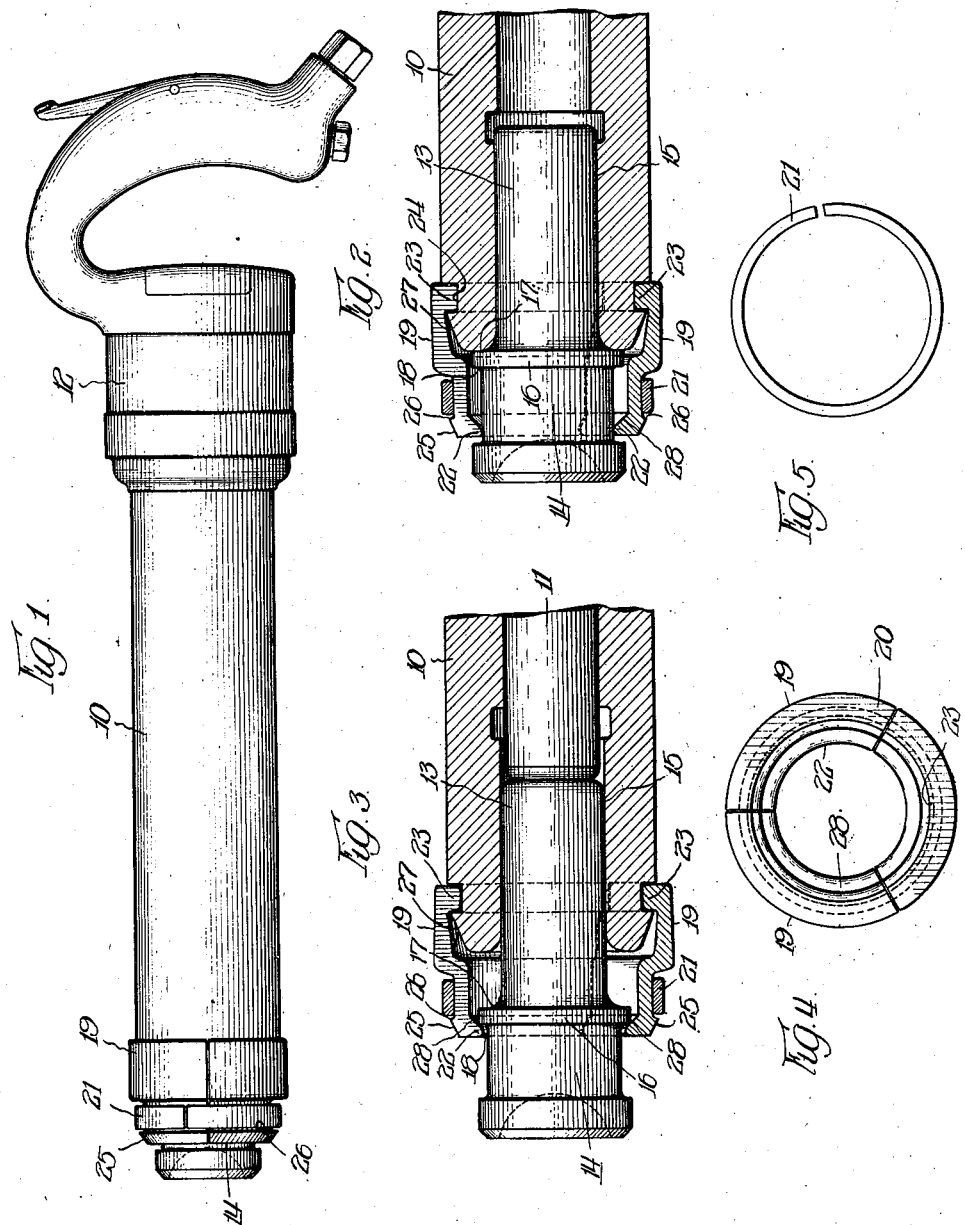

1,603,217

UNITED STATES PATENT OFFICE.

ERNEST H. SHAFF, OF GRAND HAVEN, MICHIGAN, ASSIGNOR TO WILLIAM H. KELLER, INC., OF GRAND HAVEN, MICHIGAN, A CORPORATION OF MICHIGAN.

RIVET-SET RETAINER.

Application filed September 14, 1923. Serial No. 662,593.

The invention pertains to pneumatic hammers and the like and has especial reference to the means employed for retaining the rivet set or other tool against accidental discharge from the hammer when the latter is removed from the work.

One object of the invention is to provide a retainer of a thoroughly practical character, adapted for use in connection with rivet sets of standard construction and capable of being quickly and easily applied to or removed from the hammer body.

It has been found desirable in the practical operation and use of pneumatic hammers to provide rivet set retainers which are so constructed as to cushion the blow of the rivet set upon the retaining means, and in accomplishing this result a spring is employed as the cushioning element, and this spring is so arranged that the rivet set comes in direct contact therewith. As a result there is a tendency on the part of the spring to crystallize and ultimately break. An important object of my invention is to provide a rivet set retainer embodying a yielding element or spring adapted to cushion the blow of the rivet set, but wherein the construction is such that the rivet set does not come in direct contact with the yielding element.

In the accompanying drawings I have illustrated a rivet set retainer of one preferred construction, but it is contemplated that various changes may be made therein by those skilled in the art without departing from the spirit and scope of the invention as expressed by the appended claims.

Figure 1 is a side elevational view of a pneumatic hammer equipped with a rivet set retainer constructed in accordance with my invention.

Fig. 2 is a vertical longitudinal sectional view through the forward end of the tool cylinder with the rivet set in the position which it occupies before it is struck by the hammer or piston.

Fig. 3 is a similar view but showing the rivet set driven into engagement with the retaining means and illustrating the operation of the latter.

Fig. 4 is a rear view of the retainer detached from the tool body and illustrating its segmental character.

Fig. 5 is an elevational view of a split ring constituting the yielding or cushioning element of my retainer.

The pneumatic hammer selected for purposes of illustration comprises a body or cylinder 10 in which a piston 11 is adapted to reciprocate under the control of a valve mechanism (not shown) enclosed within an annular casing 12. 13 is a tool in the form of a rivet set of standard construction and comprising a head 14 and a stem or shank 15. The head at its rear end, or at its point of connection with the stem or shank 15, is constructed to provide a collar 16 forming an annular shoulder 17 on its rear side and a similar shoulder 18 upon its forward side. The shoulder 17 is adapted to engage with the forward end or nose of the cylinder to limit the inward movement of the rivet set, and the shoulder 18 is adapted to engage with the forward end of the retaining device indicated generally at 19, which device is mounted upon the forward end or nose of the cylinder.

Said retaining device comprises a plurality of arcuate members or segments 20 of which three are herein employed (Fig. 4). In any event, a sufficient number is preferably employed to encircle completely the nose of the cylinder and thus constitute a sectional member or sleeve which because of its sectional character is capable of expanding radially. These segments I maintain in operative association about the forward end or nose of the cylinder with their forward ends extending beyond the front end of the cylinder, by means of a split ring 21, and at the forward end of each segment I provide an inwardly extending projection or flange 22 adapted to be engaged by the rivet set to limit the outward movement of the latter. At the rear end of each of the segments I provide an inturned lug or flange 23 adapted to engage in an annular groove 24 formed in the outer peripheral wall of the cylinder.

The inwardly extending projections 22 at the forward ends of the segments are located a sufficient distance forwardly of the forward end of the cylinder to provide an operating space for the collar 16 of the rivet set, and normally when the rivet set is applied to the work, the shoulder 18 upon the forward face of said collar does not contact the inturned projections 22. When, however, the tool is removed from the work and continues in operation, the inturned projections 22 serve to prevent the discharge of the rivet set by reason of the engagement of the shoulder 18 with said projections.

To receive the split ring 21 the segments are shaped to provide in the outer peripheries of the retaining device near its forward end, an annular groove or channel, the forward end portions of the several segments being reduced in diameter for this purpose. By reason of this construction the outer periphery of the split ring 21 is of lesser diameter than the greatest diameter of the retaining device. At their extreme forward ends the segments are provided with inwardly and forwardly beveled surfaces 25 terminating at their rear edges in transverse ridges 26 forming the forward wall of the channel for the split ring 21. The surfaces 25 thus provided enable the spring to be forced radially over the ridge into its retaining channel or groove.

As will be seen from a comparison of Figs. 2 and 3 the segments 20 of the device are capable of a slight pivotal movement on axes located within the groove 24. Consequently, said groove is made of a width with respect to the width of the flanges or lugs 23 at the rear ends of the segments such that such pivotal movement is possible. The extreme forward end of the cylinder, it will be noted, is tapered as at 27 to provide the usual nose which facilitates the positioning of the segments with their projections in the path of movement of the shoulder 18.

In providing means for cushioning the blow of the rivet set against the retaining device, I utilize the split ring 21 as a cushioning spring. To this end the rear faces of the inturned projections 22 upon the forward ends of the segments are tapered outwardly and rearwardly as at 28 so that when the shoulder 18 of the rivet set strikes said inclined or tapered surfaces, a cam action results tending to force the forward end of the segments radially outwardly to effect an expansion of the device against the action of the ring 21. Thus it will be observed that the rivet set instead of striking the inturned projections 22 with a sharp impact is brought to rest gradually through the operation of the ring 21 as a spring in resisting the expansion of the forward end of the device. It will be understood that it is of maximum importance that the cam surfaces 28 be properly designed and the spring so made as to cause the latter to yield under the force of a blow from the rivet set and at the same time have sufficient strength to stop the rivet set before it can escape past the projections 22; for if the spring is made too heavy and stiff, the desired effect obviously will not be gained. Also, as clearly shown in the drawings, the innermost edges of the flanges 23 are preferably rounded slightly at the forward and rear corners to facilitate the rocking motion of the segments yieldably restrained by the spring when the rivet set is driven into engagement with the cam surfaces 28.

It will be seen that I have provided a rivet set retainer which is capable of application to tools of standard construction, which is composed of a relatively small number of parts so that it may be cheaply manufactured, and which is effectual in preventing the accidental discharge of the rivet set. The device is at the same time more durable because of the fact that the rivet set does not come in direct contact with the cushioning spring; and the latter not only functions as a cushioning means but also as a means for retaining and holding the parts in operative association. A further advantage is that the parts may be readily assembled, and in disassembling them to remove the retainer from the hammer body it is only necessary to use ordinary tools.

I claim as my invention:

1. A retainer for rivet sets or other tools in pneumatic hammers and the like comprising a plurality of segments each adapted to be mounted upon the forward end of the hammer body and having forward end portions adapted to be engaged by the tool and moved radially outwardly thereby, and a split ring encircling said segments whereby to retain them in operative relation about the tool body and adapted to yield to permit a slight outward movement of the forward ends of the segments.

2. A retainer for pneumatic hammers and the like comprising, in combination with a body having a tapered forward end and an annular groove located immediately adjacent the rear end of said tapered portion, a plurality of segments each having an inturned portion at its rear end adapted to engage in said annular groove and an inturned forward end portion adapted to be engaged by a tool operable in the forward end of the body, and a split ring encircling said segments at their forward ends, the rear ends of said segments being adapted to pivot slightly in said groove to permit their forward ends to move radially outwardly, and the forward ends of said segments having inwardly extending projections with cam surfaces adapted to be engaged by said tool and moved outwardly thereby whereby the force of the blow is transmitted to said split ring.

3. A retaining device comprising, in combination, a plurality of segments each adapted to be mounted at their rear ends upon the forward end of the body of a pneumatic hammer so as to be capable of a slight radial movement at their forward ends, a split ring encircling said segments whereby to retain them in position upon the hammer body, and inwardly extending projections at the forward ends of said segments, adapted to be engaged by a tool in the forward end of said body, said segments being of reduced diameter near their forward ends and having at their extreme forward ends rearwardly and outwardly inclined outer surfaces the rear edges of which are of greater diameter than said reduced portions of the segments whereby to form a ridge adapted to retain said ring in position upon the segments.

4. A retainer for rivet sets and the like having, in combination with a tool body having a circumferential groove in its outer periphery and near its forward end, a plurality of segments having their rear ends engaging in said groove, the arrangement being such that the forward ends of the segments are permitted a limited outward swinging movement, a spring ring encircling said segments near their forward ends and adapted to resist such outward swinging movement thereof, and inwardly extending portions at the forward ends of said segments having cam surfaces adapted to be engaged by a rivet set or the like in its forward movement whereby the forward ends of the segments are moved outwardly by the rivet set against the action of said ring.

5. The combination with the cylinder of a pneumatic hammer and a rivet set or other tool operable in the forward end of the cylinder, said cylinder having a transverse groove in its outer periphery and near its forward end, of means for retaining the rivet set in the cylinder against accidental discharge comprising a member having an inturned portion or lug at its rear end engaging in said groove and an inturned projection at its forward end adapted to be engaged by said tool, the connection between the rear end of said member and the cylinder being adapted to permit of a slight outward swinging movement of the forward end of the member, and said inwardly extending projection being adapted when engaged by said tool to move outwardly, and means for yieldably resisting such outward movement.

6. The combination with a cylinder having a tool operable in its forward end, of means for retaining the tool in the cylinder against accidental discharge including a member mounted upon the tool so as to extend forwardly therefrom and having at its forward end a portion adapted to be engaged by said tool so as to be moved outwardly thereby, said connection between the member and cylinder being such as to permit a limited outward movement of the member at its forward end, and means having the dual function of holding said member upon the body and yieldably resisting such outward movement at its forward end.

7. A retaining device for pneumatic tools and the like comprising a sleeve adapted to be mounted upon the forward end of the tool and expansible radially at its forward end portion when engaged by a tool operable in the forward end of the cylinder, and a ring encircling the sleeve and adapted to hold it in operative position upon the cylinder and also resist such radial expansion of its forward end portion by said tool.

In testimony whereof, I have hereunto affixed my signature.

ERNEST H. SHAFF.